(12) United States Patent
Takagi

(10) Patent No.: US 7,104,925 B2
(45) Date of Patent: Sep. 12, 2006

(54) AUTOMATIC TRANSMISSION AND METHOD OF SETTING A STANDBY OIL PRESSURE VALUE

(75) Inventor: Kiyoharu Takagi, Okazaki (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 114 days.

(21) Appl. No.: 10/876,552

(22) Filed: Jun. 28, 2004

(65) Prior Publication Data

US 2005/0032606 A1 Feb. 10, 2005

(30) Foreign Application Priority Data

Jun. 27, 2003 (JP) .............................. 2003-184682

(51) Int. Cl.
*F16H 61/26* (2006.01)
(52) U.S. Cl. ........................ 477/156; 477/117; 477/121; 477/159
(58) Field of Classification Search ............... 477/117, 477/121, 127, 130, 156, 158, 159, 162
See application file for complete search history.

(56) References Cited

U.S. PATENT DOCUMENTS

| | | | |
|---|---|---|---|
| 5,954,776 A | * | 9/1999 | Saito et al. ............... 701/51 |
| 6,684,144 B1 | * | 1/2004 | Sekii et al. ............... 701/51 |
| 6,754,572 B1 | * | 6/2004 | Kawamoto et al. ...... 701/51 |
| 2003/0216218 A1 | | 11/2003 | Takagi |

FOREIGN PATENT DOCUMENTS

| | | | |
|---|---|---|---|
| JP | 8-86351 | * | 4/1996 |
| JP | 8-303568 | | 11/1996 |
| JP | 8-338519 | | 12/1996 |
| JP | 2002-295529 | | 10/2002 |
| JP | 2004-44715 | * | 2/2004 |

* cited by examiner

*Primary Examiner*—Ha Ho
(74) *Attorney, Agent, or Firm*—Buchanan Ingersoll PC

(57) ABSTRACT

Under the learning mode during a vehicle stationary condition, an oil pressure of the friction engagement element for setting a standby oil pressure value is increased by a predetermined step pressure while a transmission input shaft rotational speed has been maintained, and a standby oil pressure is set for shifting the friction engagement element to an engagement side. A controlled value is verified whether it is within a predetermined range corresponding to the predetermined step pressure when a change of the input value due to decrease of the turbine rotational speed satisfies a predetermined condition. The controlled value is learned when the controlled value is within the predetermined range corresponding to the step pressure. A step pressure larger than the step pressure is set when the controlled value is beyond the predetermined range corresponding to the step pressure.

6 Claims, 11 Drawing Sheets

|  |  | C1 | C2 | C3 | B1 | B2 |
|---|---|---|---|---|---|---|
| R-range | Reverse shift stage |  |  | ○ |  | ○ |
| N-range | N |  |  |  |  | ○ |
| D-range | N |  |  |  | (○) | ○ |
|  | 1st shift stage | ○ |  |  |  | ○ |
|  | 2nd shift stage | ○ |  |  | ○ |  |
|  | 3rd shift stage | ○ |  | ○ |  |  |
|  | 4th shift stage | ○ | ○ |  |  |  |
|  | 5th shift stage |  | ○ | ○ |  |  |
|  | 6th shift stage |  | ○ |  | ○ |  |

○:Engagement, Blank:Disengagement

| Mode | Normal shift | | Garaging shift | |
|---|---|---|---|---|
| | D | R | D | R |
| Piston end reference center | 364 | 491 | 399 | 403 |
| First step pressure | 10 | 15 | 15 | 15 |
| First reference width | 22 | 16 | 21 | 25 |
| Second step pressure | 20 | 25 | 25 | 25 |
| Second reference width | 38 | 32 | 40 | 46 |

AUTOMATIC TRANSMISSION AND METHOD OF SETTING A STANDBY OIL PRESSURE VALUE

CROSS REFERENCE TO RELATED APPLICATIONS

This application is based on and claims priority under 35 U.S.C. §119 with respect to a Japanese Patent Application 2003-184682, filed on Jun. 27, 2003, the entire content of which is incorporated herein by reference.

FIELD OF THE INVENTION

This invention generally relates to an automatic transmission and a method of setting a standby oil pressure value for the automatic transmission. More particularly, this invention pertains to an automatic transmission and a method of setting a standby oil pressure value for an automatic transmission capable of shortening a set period of time of a standby oil pressure value while assuring a standby oil pressure setting precision.

BACKGROUND

Conventionally, an oil pressure control for an automatic transmission has been widely known, which controls engagement and disengagement of a friction engagement element (a friction clutch and a friction brake) by adjusting an oil pressure to be supplied to the friction engagement element from an oil pressure source via a solenoid valve. In Japanese Patent Laid-Open Publication No. 2002-295529, a method of learning a clutch torque point is described for controlling the engagement and disengagement of the friction engagement element. More particularly, an electronic control unit learns a duty ratio of a duty pulse as a torque transmission initiating point (a torque point) and appropriately controls the opening operation of the solenoid valve. Therefore, the clutch can be rapidly operated to be engaged within a region before the clutch engagement. The clutch can be then completely engaged at a relatively slow engagement speed after the clutch engagement.

As illustrated in FIG. 8, an oil pressure pre-charge is performed for rapidly charging the friction engagement element with the fluid while a clutch piston (hereinafter, referred to as a piston) has been within an initial range around a forward portion of the piston. Therefore, the piston can be rapidly operated. It is necessary to improve response and traceability of the clutch after a predetermined pre-charge period of time. Therefore, the piston operating speed is decelerated about zero immediately before the engagement of the friction engagement element. The oil pressure supplied to the piston is maintained at a low oil pressure (a standby oil pressure) corresponding to force of a return spring, wherein the piston is maintained at a position. The return spring is considered as a reaction force element of the piston. As described above, the shift operation can be operated much faster and the shift shock can be avoided.

However, the spring force of the return spring varies depending on the return springs. The above described oil pressure control is different from a general oil pressure. That is, the piston stroke is controlled by the amount of fluid to be supplied to the piston. Therefore, performance specifications such as a discharge amount of oil from an oil pump affect on the clutch engagement, wherein an actually supplied pressure value can not correspond to a target pressure value. Therefore, recent developments have led to suggest a method of detecting and setting the standby oil pressure with high precision. In this case, vehicle individual differences due to fluctuations of automatic transmission, engines, and solenoid valves can be absorbed. Therefore, a vehicle or a transmission with a stabilized quality can be supplied.

As a technology for setting the standby oil pressure considering the vehicle individual differences, Japanese Patent Laid-Open Publication No. 1996-338519 describes a fluid-type friction engagement element control apparatus which can monitor changes of an input shaft rotational speed and modify a pressure immediately before occurrence of the clutch engagement force, i.e., the standby oil pressure, based upon the input shaft rotational speed changes. Further, Japanese patent Laid-Open Publication No. 1996-303568 describes an automatic transmission control apparatus that can perform a proper neutral control and set an appropriate standby oil pressure based upon a clutch engagement initial pressure upon start of the clutch engagement.

However, according to the Publication No. 1996-338519, the input shaft rotational speed change is very small and may be detected in error due to fluctuations of engine rotational speeds and noise. Further, there may be a possibility that the input shaft rotational speed change may become unclear if the clutch disengagement control and the pre-charge control is performed inappropriately. Therefore, although the fluid-type friction engagement element control apparatus described above can be applied for learning for a long-period of time, the apparatus is not effective to be applied upon an initial delivery stage.

Further, according to the publication No. 1996-338519, as far as the performance of the automatic transmission varies depending upon automatic transmissions, it is necessary to change a threshold value applied for detecting the engagement initial pressure depending upon automatic transmissions. Still further, it is necessary to consider influences due to a change of temperature (oil temperature). Further, the apparatus disclosed above can be effectively applied for detecting the standby oil pressure of the friction engagement element such as a friction clutch C1 upon the shift operation from the N position to the D position, because the input shaft rotational speed change via the clutch C1 is equivalent or less than the input shaft rotational speed change of the engine. However, it is not appropriate for detecting the standby oil pressure at the other friction engagement elements, because the input shaft rotational speed change thereof is large.

A need thus exists for providing an improved automatic transmission and method of setting an automatic transmission standby oil pressure value to obtain a standby oil pressure value with high precision.

SUMMARY OF THE INVENTION

According to an aspect of the present invention, an automatic transmission includes plural friction engagement elements for defining plural shift stages by combinations of engagement and disengagement of the plural friction engagement elements, means for controlling the engagement and disengagement of the plural friction engagement elements by controlling an oil pressure to be supplied via plural controlled solenoid valves, means for switching to a learning mode for leaning a standby oil pressure value, means for memorizing a condition for verifying a controlled value, and means for determining the standby oil pressure value based on an input value defined by at least a turbine rotational speed, the means for determining the standby oil pressure value activated by switching to the learning mode. The standby oil pressure determining means under the learning mode during a vehicle stationary condition increases an oil pressure of the friction engagement element for setting the standby oil pressure value by a predetermined step pressure $\Delta pj$ by the controlling means while a transmission input shaft rotational speed has been maintained and performs a standby oil pressure setting for shifting the friction engagement element to an engagement side, performs a standby oil pressure value verifying process for recognizing whether a controlled value Ij is within a predetermined range corresponding to the predetermined step pressure $\Delta pj$ memorized by the memorizing means when a change of the input value due to decrease of the turbine rotational speed satisfies a predetermined condition, learns the controlled value Ij when the controlled value Ij is within the predetermined range corresponding to the step pressure $\Delta pj$, and sets a step pressure $\Delta pj+1$ larger than the step pressure $\Delta pj$ and performs the standby oil pressure setting and the standby oil pressure value verifying process again when the controlled value Ij is beyond the predetermined range corresponding to the step pressure $\Delta pj$.

According to another aspect of the present invention, an automatic transmission includes plural friction engagement elements for defining plural shift stages by combinations of engagement and disengagement of the plural friction engagement elements, means for controlling the engagement and disengagement of the plural friction engagement elements by controlling an oil pressure to be supplied via plural controlled solenoid valves, means for switching to a learning, mode for learning a standby oil pressure value, means for memorizing a condition for verifying a controlled value, and means for determining the standby oil pressure value based on an input value defined by at least a turbine rotational speed, the means for determining the standby oil pressure value activated by switching to the learning mode. The standby oil pressure determining means under the learning mode during a vehicle stationary condition increases an oil pressure of the friction engagement element for setting the standby oil pressure value by a predetermined step pressure $\Delta pk$ by the controlling means every predetermined period of time and performs a standby oil pressure setting for shifting the friction engagement element to an engagement side while a transmission input shaft rotational speed has been maintained during a vehicle stationary condition, detects a controlled value Ik when a change of the input value due to decrease of the turbine rotational speed satisfies a predetermined condition through the standby oil pressure setting, performs a standby oil pressure value verifying process for recognizing whether the controlled value Ik is within a predetermined range corresponding to the predetermined step pressure $\Delta pk$, sets a step pressure $\Delta pk-1$ smaller than the step pressure $\Delta pk$ as the predetermined step pressure and repeats the standby oil pressure setting and the standby oil pressure verifying process from a controlled value $\Delta Ik-1$ smaller than the controlled value $\Delta Ik$ when the controlled value $\Delta Ik$ is within the predetermined range corresponding to the step pressure $\Delta pk$, and learns the controlled value Ik at the step pressure $\Delta pk$ when the controlled value $\Delta Ik-1$ at the step pressure $\Delta pk-1$ is beyond a predetermined range corresponding to the step pressure $\Delta pk-1$.

It is preferable that the standby oil pressure value determining means sets a step pressure $\Delta p0$ larger than an initial step pressure $\Delta p1$ and learns a controlled value I0 when a controlled value I1 corresponding to the initial step pressure $\Delta p1$ is beyond a predetermined range corresponding to the initial step pressure $\Delta p1$, the controlled value I0 at a time when the change of the input value due to the decrease of the turbine rotational speed satisfies the predetermined condition through the standby oil pressure value setting.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

Figures 1, 2:
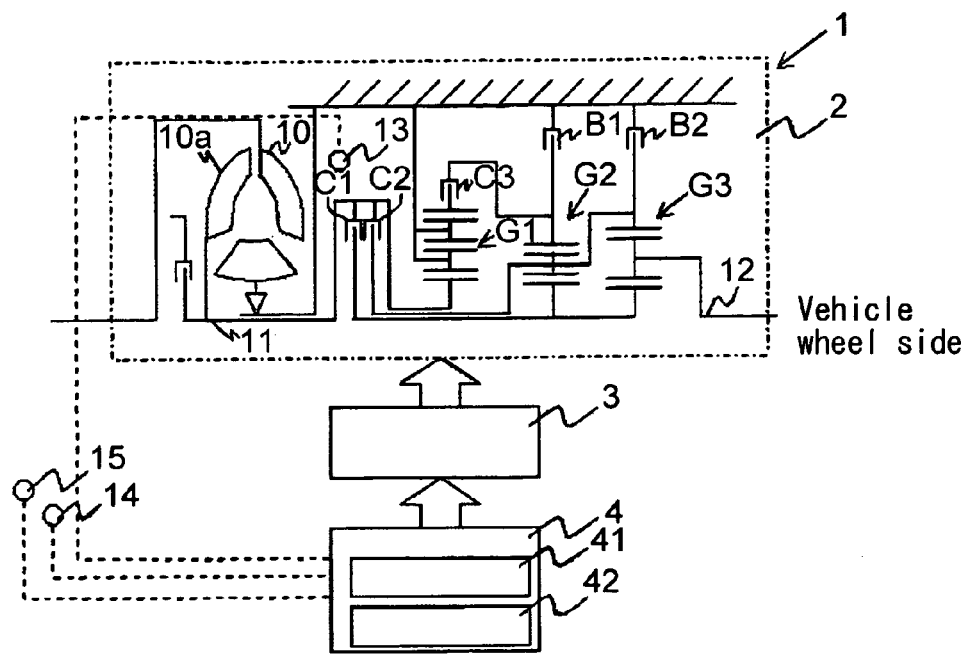
FIG. 1 is a schematic view illustrating an entire structure of an automatic transmission according to a first embodiment of the present invention.
FIG. 2 is a table explaining a relationship between a shift stage and engagement/disengagement of friction engagement elements.

As especially seen in FIG. 1, an automatic transmission 1 is configured with an automatic transmission main body 2, an oil pressure control unit 3, and an electronic control unit 4, i.e., means for controlling. The automatic transmission main body 2 includes an input shaft 11 connected to a turbine 10$a$ of a torque converter 10, an output shaft 12, which is connected to a vehicle wheel, a double pinion planetary gear set G1, which is connected to the input shaft 11, single pinion planetary gear sets G2 and G3. The automatic transmission main body 2 further includes five friction engagement elements of a first friction clutch C1, a second friction clutch C2, a third friction clutch C3, a first friction brake B1, and a second friction brake B2. The five friction engagement elements are engaged and disengaged by the oil pressure control unit 3 and the electronic control unit 4 so that a selected shift stage is established in the automatic transmission main body 2 in accordance with the engagement and disengagement of the five friction engagement elements.

Figures 3, 4:
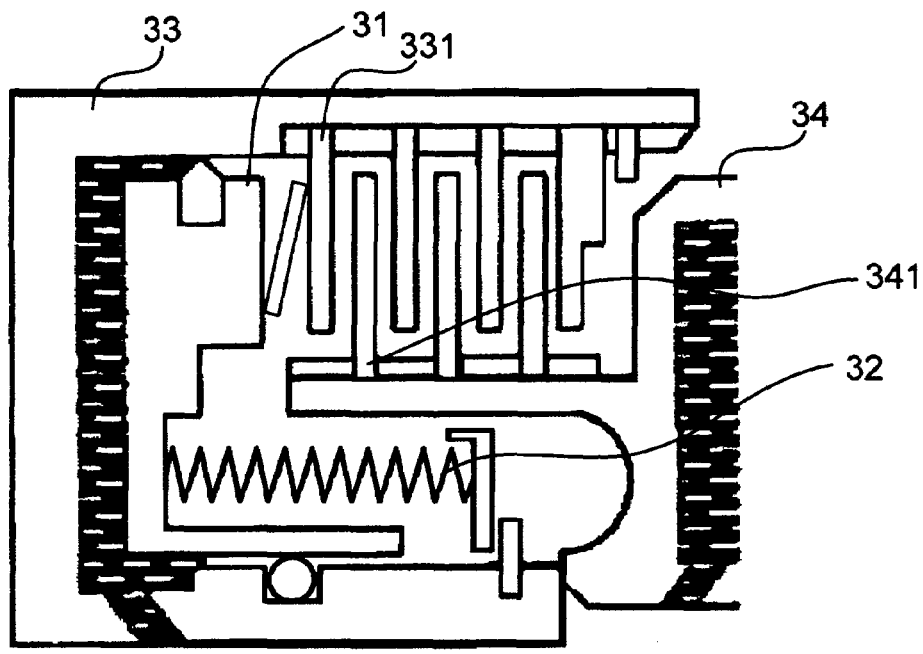
FIG. 3 is a diagram illustrating a wet-type multi plates clutch as one of the friction engagement elements.
FIG. 4 is a diagram explaining a relationship between a step pressure for a standby oil pressure verification and a reference value corresponding to each step pressure.

As illustrated in FIG. 3, the friction engagement element is provided with a piston 31, a return spring 32 as a reaction force element of the piston 31, driven plates 331 disposed at a side of a clutch drum 33, drive plates 341 disposed at a side of a clutch hub 34. The piston 31 is supplied with the oil pressure by the oil pressure control unit 3 and is sufficiently moved and pushed to the plates. The friction occurs between the driven plates 331 and the drive plates 341, respectively. Therefore, the friction clutch engagement is shifted to an engaged condition such that a turbine rotational speed Nt is decreased. On the other hand, when the oil pressure supplied to the piston 31 is decreased by the oil pressure control unit 3, the return spring 32 pushes the piston 31 back such that the friction engagement element is shifted to a disengaged condition.

An oil pressure circuit in the oil pressure control unit 3 is switched by the electronic control unit 4, thereby enabling to select the friction engagement element to be supplied with the oil pressure and controlling the supplied oil pressure.

The automatic transmission main body 2 according to the embodiment of the present invention is further provided with a turbine rotational speed sensor 13 for detecting a turbine rotation number Nt of the input shaft 11 (the turbine 10a). The signal outputted from the sensor 13 is inputted into the electronic control unit 4. Further, a position sensor 14 is provided to detect a position of a selector lever (not shown) operated by a driver. The signal outputted from the position sensor 14 is inputted into the electronic control unit 4. Still further, an engine rotational speed sensor 15 is provided to detect an engine rotational number Ne. The signal outputted from the engine rotational speed sensor 15 is also inputted into the electronic control unit 4. The electronic control unit 4 is a computer for controlling the oil pressure control unit 3 based upon the inputted signals. The electronic control unit 4 further includes means (not illustrated) for memorizing a controlled value of an electric current value defined for each friction engagement element and each step pressure value (as illustrated in FIG. 4), means 41 for switching to a learning mode for learning a standby oil pressure value, and means 42 for determining a standby oil pressure value. Each of the means 41 for switching (hereinafter, referred to as the learning mode switching means 41) and the means 42 for determining the standby oil pressure value (hereinafter, refereed to as the standby oil pressure value determining means 42) is configured with a computer program, respectively. When a predetermined operation, which can be detected by the computer of the electronic control unit 4, is performed, the learning mode switching means 41 initiates setting the standby pressure that is described later.

The wet-type multi plates friction clutch of the oil pressure system is represented in accordance with the following differential equations (1) and (2):

$$\frac{dPc}{dt} = \frac{K}{V}\left(Qs - Ap\frac{dx}{dt} - Qb\right), \quad (1)$$

and $$m\frac{d^2x}{dt^2} + c\frac{dx}{dt} + k \times x + Fset = Ap \times Pc. \quad (2)$$

The parameter Pc represents an engagement oil pressure, the parameter K represents a modulus of volume elasticity, the parameter V represents a volume, the parameter Qs represents a quantity of an input oil, the parameter Qb represents a quantity of a leak oil, the parameter Ap represents an area of piston to be applied with the oil pressure, the parameter K×x+Fset represents a return spring force, the parameter m represents an inertia of the piston, and the parameter C represents a damping coefficient.

Hereinafter, the following explanation will be given assuming that the electronic control unit 4 operates with a step-like oil pressure wave generated by increasing the oil pressure corresponding to the step pressure with a sufficient time interval. That is, when the step pressure is very small and the step time interval is sufficiently large, the change of the oil amount can be ignored. Further, the piston operating speed is slow and substantially constant. Therefore, the damping force of the oil pressure supplied to the piston does not have to be necessarily considered, and the piston can be considered under a substantially stationary condition.

Under the above condition, it is necessary to consider only third and fourth sections in the left side of a mathematical equation (2). In this case, the following equation (3) is defined:

$$Pc = \frac{k \times x + Fset}{Ap}. \quad (3)$$

When the piston is moved to the engagement side under the stationary condition, and the piston is detected to have shifted to an end of a region where the oil is supplied to the piston, an indicate pressure at this point can be employed as the engagement pressure Pc (a return spring force corresponding pressure).

As described above, in order to obtain a good precision for setting the standby oil pressure value, it is preferable to maintain the piston under the stationary condition by defining the sufficiently wide step interval time. However, the time for detecting and setting the standby oil pressure value may be limited. On the other hand, if the sufficiently wide step interval time is not obtained, the piston may not be able to be maintained under the stationary condition, thereby deteriorating the precision for setting the standby oil pressure value. When the step pressure is relatively small, the input shaft rotational speed change becomes too slow. Therefore, it may delay determination of the standby oil pressure. On the other hand, if the step pressure is relatively large, the standby oil pressure determination delay can be prevented. However, since the step pressure is relatively large, the precision of setting the standby oil pressure may be deteriorated in response to the step pressure.

As an illustrative example, a method of setting the standby oil pressure value of the friction clutch C3 is described hereinbelow. As explained in FIG. 2, when the shift lever (not shown) is positioned at a neutral range, the friction brake B2 is engaged. When the shift lever is positioned at a reverse range, the friction clutch C3 and the friction brake B2 are engaged. For example, when the select lever is shifted from the neutral range to the reverse range while the above-described program has been operated during the engine activation and the vehicle stationary condition (the output shaft 12 is fixed), the electronic control unit 4 engages the friction brake B2 via the oil pressure control unit 3 in advance. As described, above, the friction bake B2 has been already engaged under the neutral range. Therefore, the electronic control unit 4 maintains the friction brake B2 under the engaged condition. Next, the electronic control unit 4 outputs a drive signal for little by little increasing the oil pressure of the friction clutch C3 by a step pressure ΔP every time interval Δt (e.g. 0.9 sec) via the oil pressure control unit 3.

Figure 5:
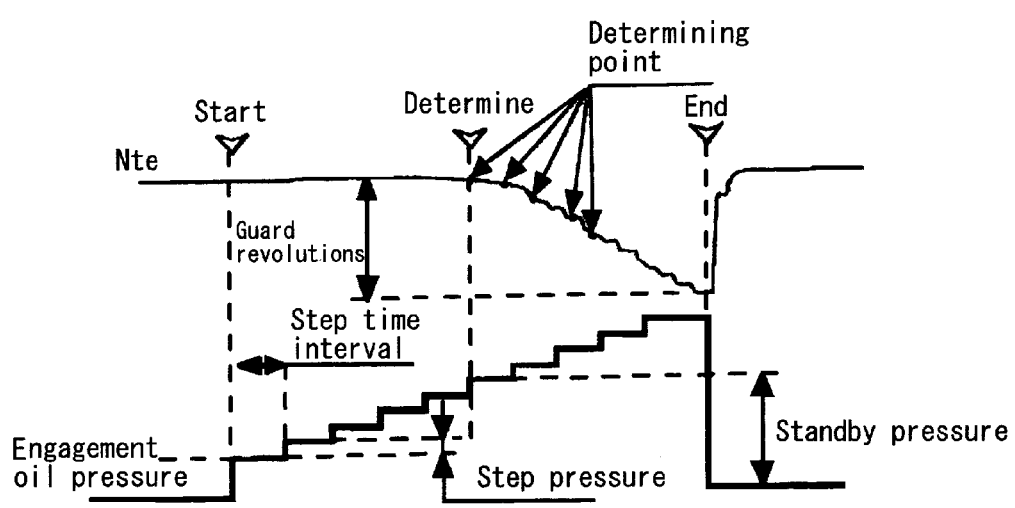
FIG. 5 is a view explaining a step-like oil pressure wave and a transit of a turbine rotational speed.

As illustrated in FIG. 5, the electronic control unit 4 also monitors an input value Nte based upon the turbine rotational speed Nt or the engine rotational speed Ne at a cycle that is sufficiently shorter than the step time interval Δt. When a predetermined condition is satisfied, e.g., when the turbine rotational speed has been decreased successively n times regardless of noise, by monitoring the input value Nte with 100 msec time interval, the electronic control unit 4 detects whether the piston has deviated from the region where the oil is supplied to the piston (i.e., a piston end). When the piston has deviated from the piston end, an electric current value I of the solenoid valve corresponding to the engagement oil pressure Pc at this point (or the engagement oil pressure Pc) can be set as an electric current value of the standby oil pressure value of the friction clutch C3 (or as the standby oil pressure value).

According to the first embodiment of the present invention, the electronic control unit 4 detects whether the electric current value I (or the engagement oil pressure Pc) is within a predetermined range such as a factory shipment standard or designed minimum and maximum values. When the electric current value I is not within the predetermined range, the step pressure ΔP is changed to be a larger pressure value, and the standby oil pressure value is verified again.

Figure 6:
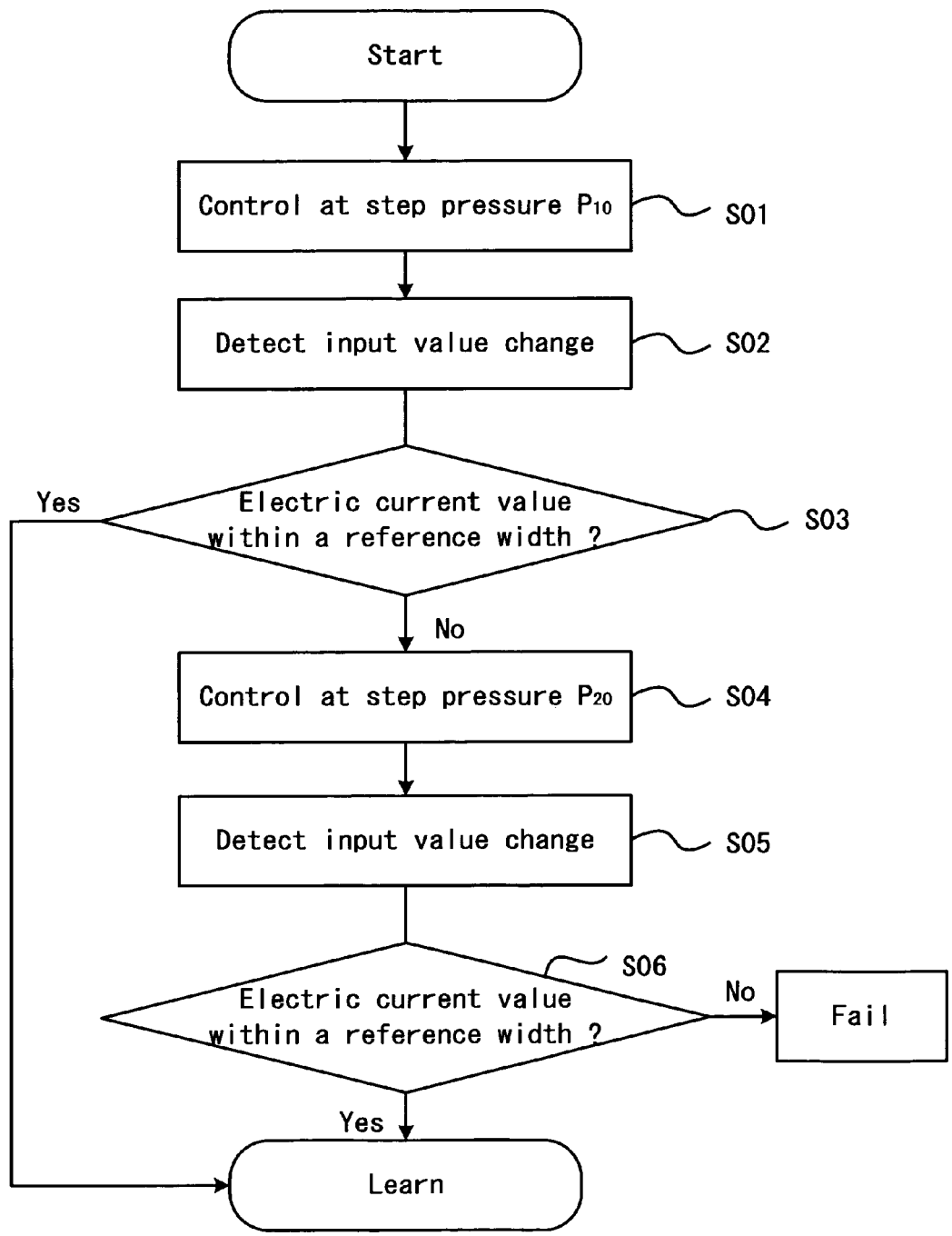
FIG. 6 is a flowchart for explaining an operation according to the first embodiment of the present invention.
Figure 7:
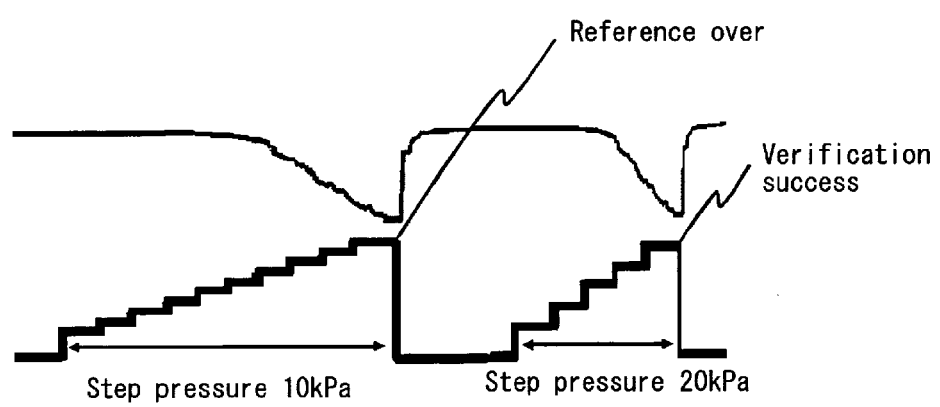
FIG. 7 is a view explaining an example of the step-like oil pressure wave according to the first embodiment of the present invention.
Figure 8A:
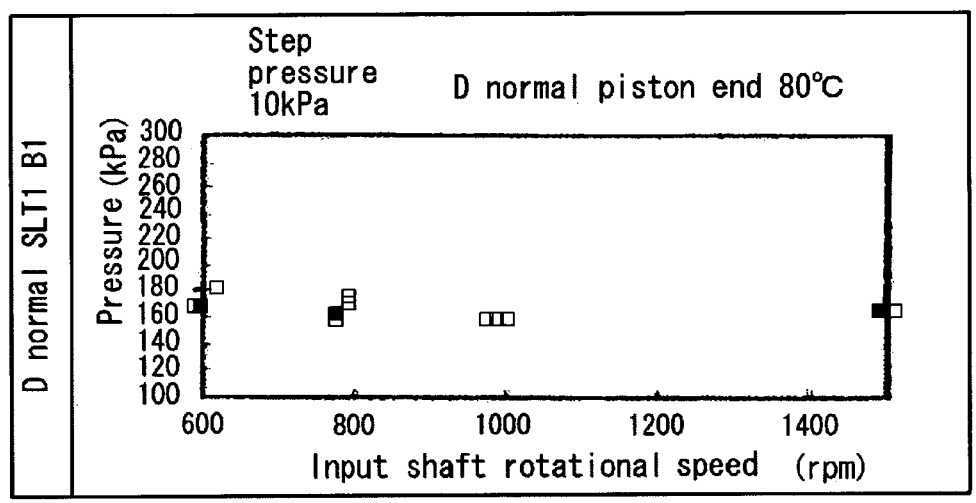
FIGS. 8($a$), 8($b$), 8($c$), and 8($d$) explain test results of the standby oil pressure value with the step pressure 10 kPa for each friction engagement element under each condition.
Figure 8B:
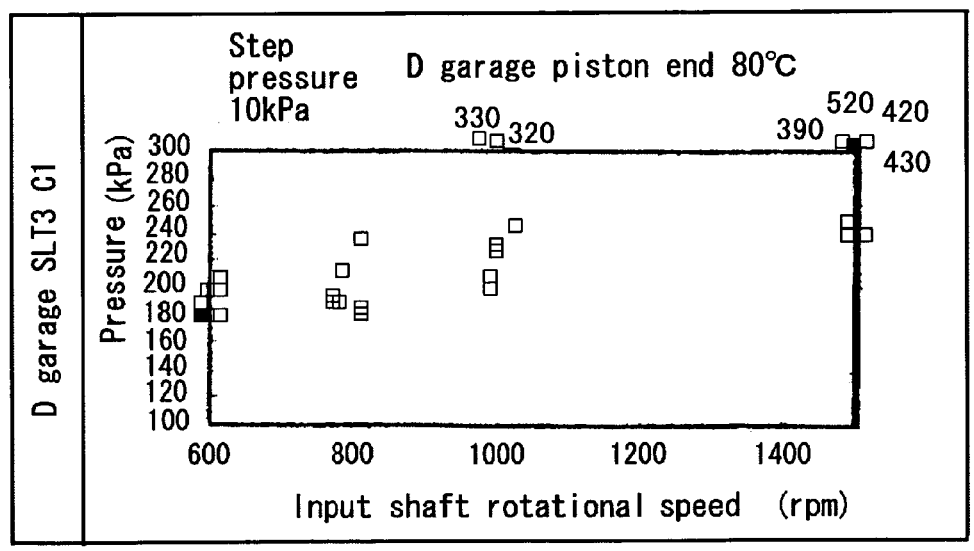
Figure 8C:
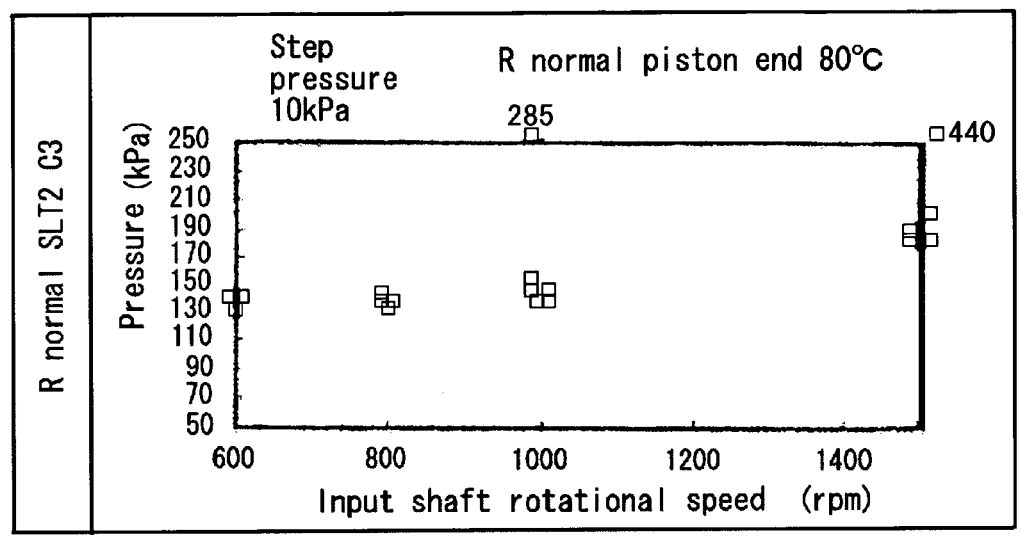
Figure 8D:
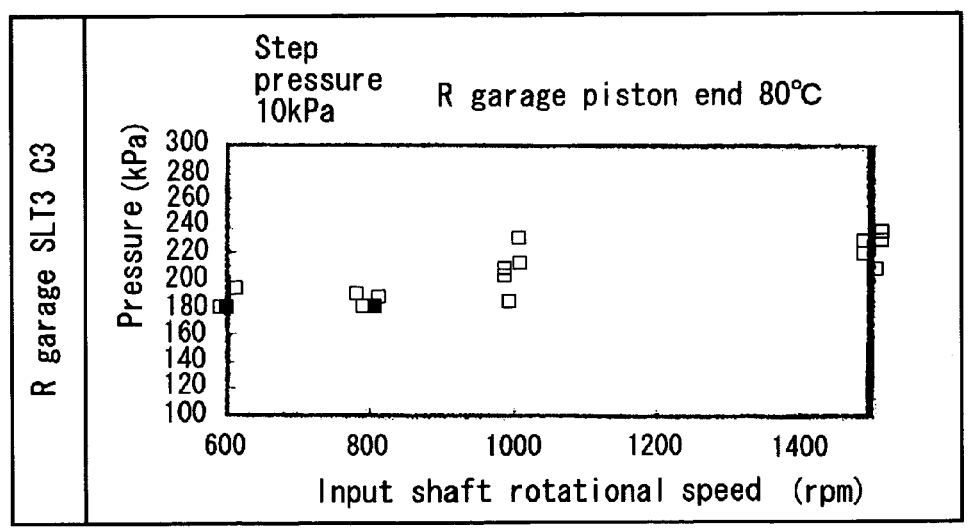

Following explanation will be given with an example of the above. As explained in FIGS. 6 and 7, when the mode is shifted to the learning mode, at step S01, the standby oil pressure value determining method 42 of the electronic control unit 4 outputs the drive signal for setting a step-like standby oil pressure to the oil pressure control unit 3. For example, the step-like standby oil pressure can possess the step pressure 10 kPa. At step S02, the electronic control unit 4 detects an electric current value $I_{10}$ at a point when the input value Nte satisfies the predetermined condition. The electric current value $I_{10}$ represents that the piston has deviated from the piston end. At step S03, the standby oil pressure value determining means 42 determines whether the electric current value $I_{10}$ is within a range of a reference width ±25 mA of the electric current value corresponding to the step pressure 10 kPa. When the electric current value $I_{10}$ is within the range, the standby oil pressure value verification is terminated. On the other hand, when the electric current value $I_{10}$ is not within the range, the standby oil pressure value determining means 42 outputs a drive signal for setting the step-like standby oil pressure with the step pressure 20 kPa at step S04. At step S05, the electronic control unit 4 detects an electric current value $I_{20}$ at a point when the input value Nte satisfies the predetermined condition. The electric current value $I_{20}$ represents that the piston has passed the piston end. At step S06, the standby oil pressure value determining means 42 determines whether the electric current value $I_{20}$ is within a range of a reference width ±40 mA of the electric current value corresponding to the step pressure 20 kPa. When the electric current value $I_{20}$ is within the range, the standby oil pressure verification is terminated. On the other hand, when the electric current value $I_{20}$ is not within the range, the standby oil pressure value determining means determines that the standby oil pressure value verification failed.

As described above, when the indicate pressure value (the electric current value) is different from the actual pressure value (the reference value), and fluctuation thereof is relatively small, the standby oil pressure value verification is performed only one time. However, when this first standby oil pressure value verification failed, a second step pressure which is larger than the first step pressure is employed. Therefore, the second verification can be performed faster than the first verification. Further, the input shaft rotational speed change becomes larger, wherein the standby oil pressure can be reliably verified.

Figure 9A:
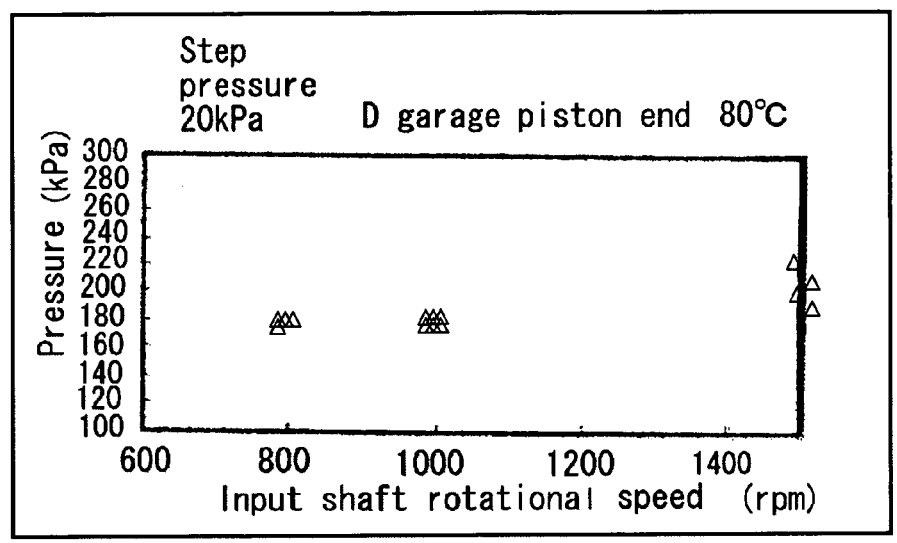
FIGS. 9(A), 9(B) and 9(C) explain test results of the standby oil pressure value 10 with the step pressure 20kPa for the friction engagement elements except for the friction brake B1 of which standby oil pressure value verification did not fail.
Figure 9B:
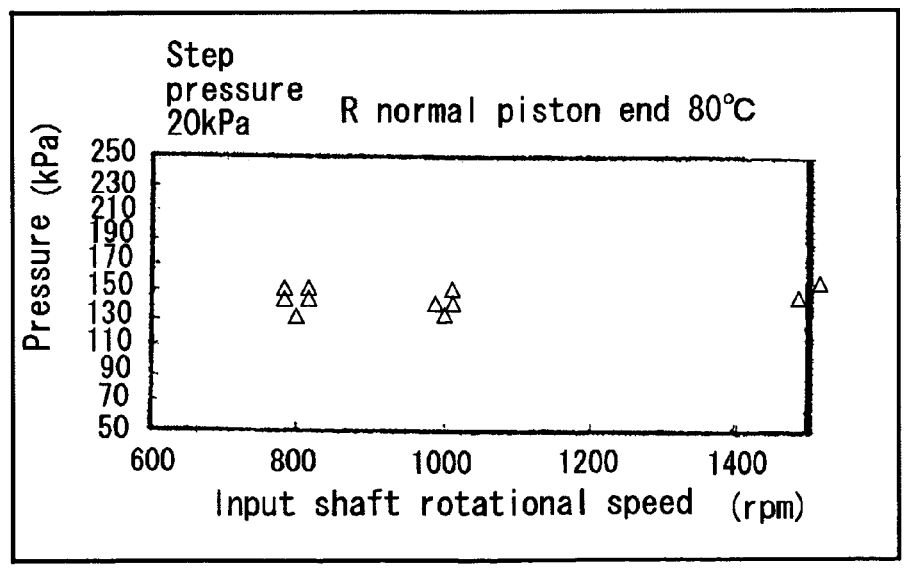
Figure 9C:
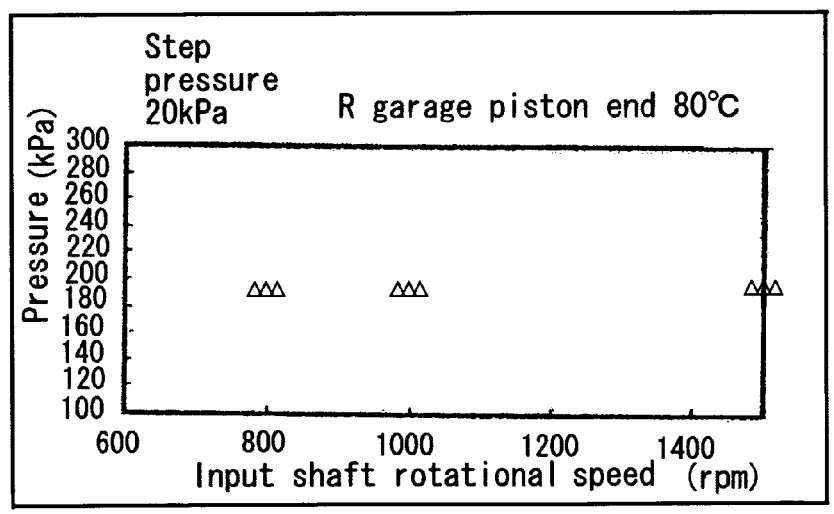

FIGS. 8(a), 8(b), 8(c), and 8(d) explain test results of the standby oil pressure value with the step pressure 20 kPa for each friction engagement element. Each test was performed by changing the capacity of the torque converter for transmitting the torque and decreasing the number of frictional material by one. FIGS. 9(A), 9(B) and 9(C) explain test results of the standby oil pressure value with the step pressure 20 kPa for the friction engagement elements except for the friction brake B1 of which standby oil pressure value verification did not fail. As explained in FIGS. 8 and 9, regarding the friction engagement elements of which standby oil pressure value fluctuates due to the determination delay and so on at the step pressure 20 kPa, if the standby oil pressure value for these friction engagement elements are verified again with the step pressure 20 kPa, a sufficiently stabilized result can be obtained. Therefore, the method of setting the standby oil pressure value according to the first embodiment of the present invention is recognized to be preferably employed regardless of the friction engagement elements.

Further, according to the first embodiment, only the first and second verifications can be performed in light of a practical point. However, when a sufficient time for verification is left, a third verification with the step pressure 30 kPa can be additionally performed in the substantially same manner as described above.

Next, following explanation will be given for explaining the method of setting the standby oil pressure value according to a second embodiment. Explanation of the same portions to the first embodiment will be omitted hereinafter. The standby oil pressure determining means 42 first outputs the drive signal defining the step-like oil pressure wave with a relatively large step pressure. The electronic control unit 4 also monitors the input value Nte in the same manner as the first embodiment with a predetermined time interval, and detects whether the piston has passed the piston end (FIG. 5). Further, the electronic control unit 4 determines whether the detected electric current I (or the engagement pressure Pc) is within a predetermined range such as factory shipment standard or designed minimum and maximum values. When the electric current value I is within the predetermined range, the step pressure ΔP is changed to be a smaller pressure value, and the standby oil pressure verification is performed again with a smaller electric current value than the electric current value I. This method is performed for improving the precision for setting the standby oil pressure value and for shortening the period for the next verification by setting the electric current value I obtained at the previous step. Therefore, the standby oil pressure value can be obtained with a further improved precision.

Figure 10:
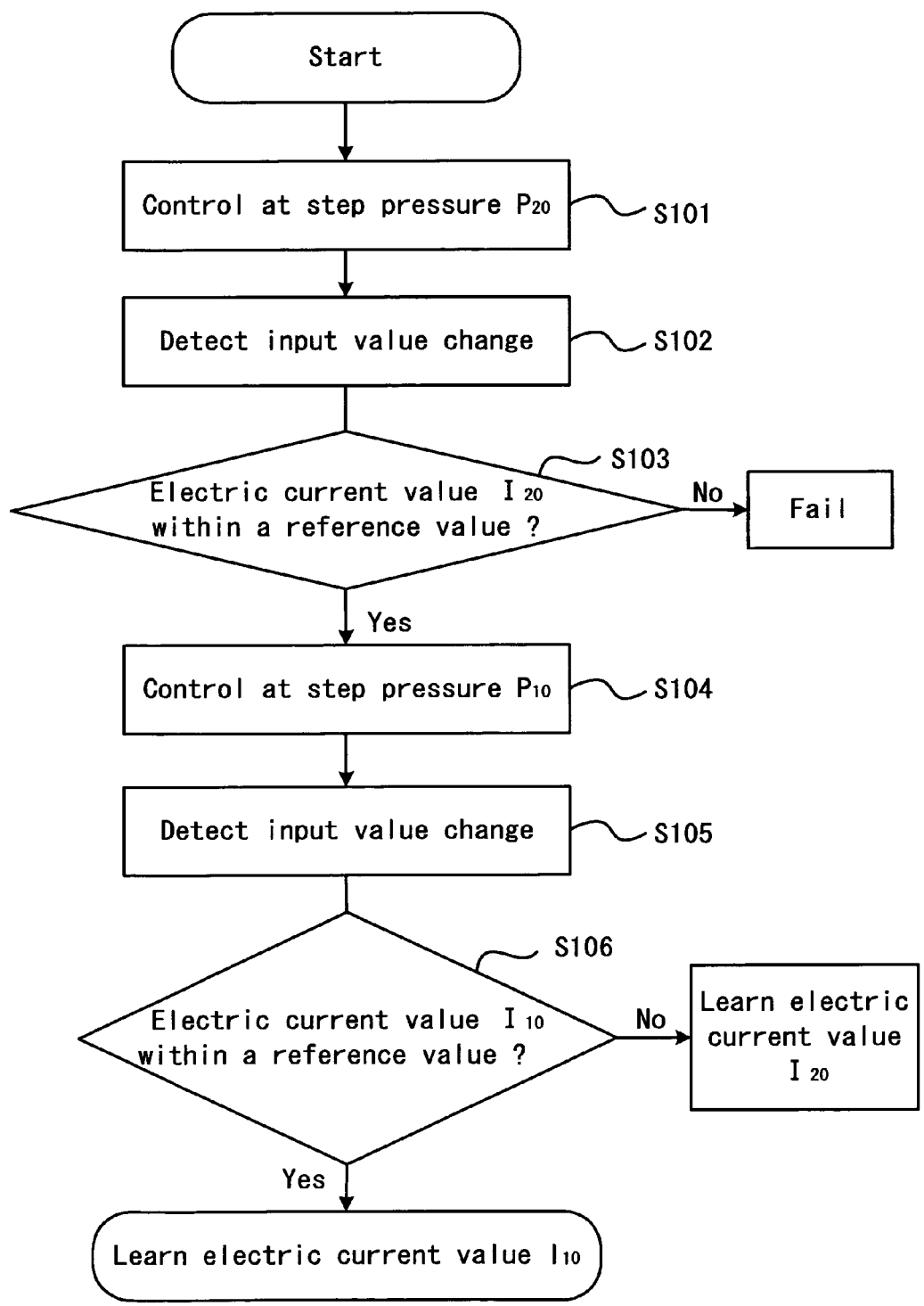
FIG. 10 is a flowchart for explaining an operation according to a second embodiment of the present invention.
Figure 11:
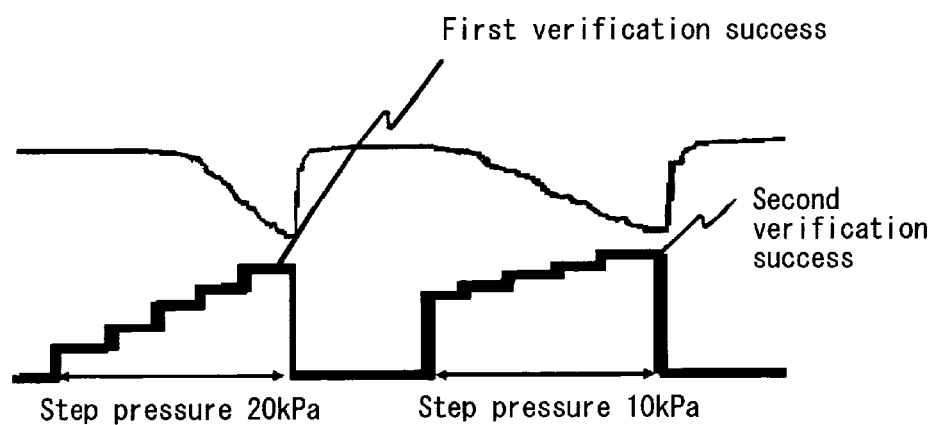
FIG. 11 is a view explaining an example of the step-like oil pressure wave according to the second embodiment of the present invention.

Following explanation will be given with an example of the above. As explained in FIGS. 10 and 11, when the mode is shifted to the learning mode, at step S101, the standby oil pressure value determining means 42 of the electronic control unit 4 outputs a drive signal for setting a step-like standby oil pressure with the step pressure 20 kPa. At step S102, the standby oil pressure value determining means 42 detects an electric current value $I_{20}$ at a point when the input value Nte satisfies the predetermined condition. The electric current value $I_{20}$ represents that the piston has deviated from the piston end. At step S103, the standby oil pressure value determining means 42 determines whether the electric current value $I_{20}$ is within a range of a reference width ±40 mA of the electric current value corresponding to the step pressure 20 kPa. When the electric current value $I_{20}$ is not within the range, the standby oil pressure verification is determined to have failed. On the other hand, when the electric current value I10 is within the range, the standby oil pressure value verification is performed again with the step pressure 10 kPa for example and with an electric current value. $I_{20-n}$ as an initial value at steps S104 and S105. At step S106, the standby oil pressure value determining means 42 determines whether the electric current value $I_{10}$ is within a range of a reference width ±250 mA of the electric current value corresponding to the step pressure 10 kPa, for example. When the electric current value $I_{10}$ is within the range, the standby oil pressure verification is terminated. On the other hand, when the electric current value $I_{10}$ is not within the range, the electric current $I_{20}$ obtained at step S102 is learned.

As described above, according to the second embodiment of the present invention, a rough standby oil pressure value is first obtained with a step pressure which possesses a relatively high response. The appropriate standby oil pressure value is then smoothly obtained with a step pressure which possesses a higher precision. That is, the total verification time is shortened since the larger step pressure is employed for the first verification. Further, the set range of the second step pressure can be determined based upon the test result of the first verification. Therefore, the standby oil pressure value can be verified smoothly and with high precision. When the difference between the indicate pressure and the actual pressure and the fluctuation thereof are relatively small, the second verification can be performed with the high precision. When the difference and the fluctuation is relatively large, the input shaft rotational speed change becomes large, and the first verification can be performed with the high detecting response. Therefore, the standby oil pressure verification can be reliably performed depending on the vehicle driving condition.

Further, according to the second embodiment, only the first and second verifications can be performed in light of a practical point. However, when a sufficient time for verification is left, the standby oil pressure value can be verified more. For example, the first verification can be performed with the step pressure 25 kPa, the second verification can be performed with the step pressure 20 kPa, and a third verification can be performed with the step pressure 10 kPa.

Further, according to the second embodiment, when the electric current value is not within the predetermined value ±40 mA at the first verification, the standby oil pressure value verification is determined to have failed. However, a third verification with the step pressure ±30 kPa can be additionally performed, as a non-limiting example. Or, the program can be moved to the method of setting according to the first embodiment.

According to the above-described first and second embodiments, an electric current value is employed for controlling a linear solenoid valve which performs the standby oil pressure control. However, some other parameters which can be substituted for the electric current value can be employed. Further, the step time interval is 900 ms as described above. However, the step time interval with the step pressure 10 kPa can be 900 ms, and the step time interval with the step pressure 20 kPa can be 1200 ms. That is, the step time interval can be changed depending on the step pressures.

Therefore, according to the first and second embodiments of the present invention, vehicle individual differences can be absorbed, and the standby oil pressure with high precision can be set easily.

The principles, preferred embodiments and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An automatic transmission comprising:
    plural friction engagement elements for defining plural shift stages by combinations of engagement and disengagement of the plural friction engagement elements;
    means for controlling the engagement and disengagement of the plural friction engagement elements by controlling an oil pressure to be supplied via plural controlled solenoid valves;
    means for switching to a learning mode for learning a standby oil pressure value;
    means for memorizing a condition for verifying a controlled value; and
    means for determining the standby oil pressure value based on an input value defined by at least a turbine rotational speed, the means for determining the standby oil pressure value activated by switching to the learning mode,
    wherein the standby oil pressure determining means under the learning mode during a vehicle stationary condition
    increases an oil pressure of the friction engagement element for setting the standby oil pressure value by a predetermined step pressure $\Delta pj$ by the controlling means while a transmission input shaft rotational speed has been maintained and performs a standby oil pressure setting for shifting the friction engagement element to an engagement side,
    performs a standby oil pressure value verifying process for recognizing whether a controlled value Ij is within a predetermined range corresponding to the predetermined step pressure $\Delta pj$ memorized by the memorizing means when a change of the input value due to decrease of the turbine rotational speed satisfies a predetermined condition;
    learns the controlled value Ij when the controlled value Ij is within the predetermined range corresponding to the step pressure $\Delta pj$, and
    sets a step pressure $\Delta pj+1$ larger than the step pressure $\Delta pj$ and performs the standby oil pressure setting and the standby oil pressure value verifying process again when the controlled value Ij is beyond the predetermined range corresponding to the step pressure $\Delta pj$.

2. An automatic transmission comprising:
    plural friction engagement elements for defining plural shift stages by combinations of engagement and disengagement of the plural friction engagement elements;
    means for controlling the engagement and disengagement of the plural friction engagement elements by controlling an oil pressure to be supplied via plural controlled solenoid valves;
    means for switching to a learning mode for learning a standby oil pressure value;
    means for memorizing a condition for verifying a controlled value; and
    means for determining the standby oil pressure value based on an input value defined by at least a turbine rotational speed, the means for determining the standby oil pressure value activated by switching to the learning mode, wherein the standby oil pressure determining means under the learning mode during a vehicle stationary condition
- increases an oil pressure of the friction engagement element for setting the standby oil pressure value by a predetermined step pressure $\Delta pk$ by the controlling means every predetermined period of time and performs a standby oil pressure setting for shifting the friction engagement element to an engagement side while a transmission input shaft rotational speed has been maintained during the vehicle stationary condition,
- detects a controlled value Ik when a change of the input value due to decrease of the turbine rotational speed satisfies a predetermined condition through the standby oil pressure setting,
- performs a standby oil pressure value verifying process for recognizing whether the controlled value Ik is within a predetermined range corresponding to the predetermined step pressure $\Delta pk$;
- sets a step pressure $\Delta pk-1$ smaller than the step pressure $\Delta pk$ as the predetermined step pressure and repeats the standby oil pressure setting and the standby oil pressure verifying process from a controlled value $\Delta Ik-1$ smaller than the controlled value Ik when the controlled value Ik is within the predetermined range corresponding to the step pressure $\Delta pk$; and
- learns the controlled value Ik at the step pressure $\Delta pk$ when the controlled value $\Delta Ik-1$ at the step pressure $\Delta pk-1$ is beyond a predetermined range corresponding to the step pressure $\Delta pk-1$.

3. The automatic transmission according to the claim 2 wherein, the standby oil pressure value determining means sets a step pressure $\Delta p0$ larger than an initial step pressure $\Delta p1$ and learns a controlled value I0 when a controlled value I1 corresponding to the initial step pressure $\Delta p1$ is beyond a predetermined range corresponding to the initial step pressure $\Delta p1$, the controlled value I0 at a time when the change of the input value due to the decrease of the turbine rotational speed satisfies the predetermined condition through the standby oil pressure value setting.

4. A method of setting a standby oil pressure value after pre-charging an automatic transmission having plural friction engagement elements defining plural shift stages by combinations of engagement and disengagement of the plural friction engagement elements; means for controlling the engagement and disengagement of the plural friction engagement elements by controlling an oil pressure to be supplied via plural controlled solenoid valves; and means for determining the standby oil pressure value based on an input value defined by at least a turbine rotational speed, the standby oil pressure value setting method comprising the steps of:
- increasing an oil pressure of the friction engagement element for setting the standby oil pressure value by a predetermined step pressure $\Delta pj$ by the controlling means every predetermined period of time and performing a standby oil pressure setting for shifting the friction engagement element to an engagement side while a transmission input shaft rotational speed has been maintained during a vehicle stationary condition;
- performing a standby oil pressure value verifying process by the standby oil pressure determining means for recognizing whether a controlled value Ij is within a predetermined range corresponding to the step pressure $\Delta pj$ when a change of the input value due to decrease of the turbine rotational speed satisfies a predetermined condition;
- learning the controlled value Ij by the standby oil pressure determining means when the controlled value Ij is within the predetermined range corresponding to the step pressure $\Delta pj$; and
- setting a step pressure $\Delta pj+1$ larger than the step pressure $\Delta pj$ and performing the standby oil pressure setting and the standby oil pressure value verifying process again when the controlled value Ij is beyond the predetermined range.

5. A method of setting a standby oil pressure value after pre-charging an automatic transmission having plural friction engagement elements defining plural shift stages by combinations of engagement and disengagement of the plural friction engagement elements; means for controlling the engagement and disengagement of the plural friction engagement elements by controlling an oil pressure to be supplied via plural controlled solenoid valves; and means for determining the standby oil pressure value based on an input value defined by at least a turbine rotational speed, the standby oil pressure value setting method comprising the steps of:
- increasing an oil pressure of the friction engagement element for setting the standby oil pressure value by a predetermined step pressure $\Delta pk$ by the controlling means every predetermined period of time and performing a standby oil pressure setting for shifting the friction engagement element to an engagement side while a transmission input shaft rotational speed has been maintained during a vehicle stationary condition;
- detecting a controlled value Ik by the standby oil pressure value determining means, the control value Ik at a point when the input value change due to the turbine rotational speed decrease satisfies a predetermined condition;
- performing a standby oil pressure value verifying process for recognizing whether the controlled value Ik is within a predetermined range corresponding to the predetermined step pressure $\Delta pk$,
- setting a step pressure $\Delta pk-1$ smaller than the step pressure $\Delta pk$ as the predetermined step pressure and performing the standby oil pressure setting and the standby oil pressure value verifying process again from a controlled value $\Delta Ik-1$ smaller than the controlled value Ik when the controlled value Ik is within the predetermined range corresponding to the step pressure $\Delta pk$;
- learning the controlled value Ik at the step pressure $\Delta pk$ when the controlled value $\Delta Ik-1$ at the step pressure $\Delta pk-1$ is beyond a predetermined range corresponding to the step pressure $\Delta pk-1$.

6. A method of setting the standby oil pressure value according to claim 5, wherein the standby oil pressure value determining means sets a step pressure $\Delta p0$ larger than an initial step pressure $\Delta p1$ and learns a controlled value I0 when a controlled value I1 corresponding to the initial step pressure $\Delta p1$ is beyond a predetermined range corresponding to the initial step pressure $\Delta p1$, the controlled value I0 at a point when the change of the input value due to the decrease of the turbine rotational speed satisfies the predetermined condition through the standby oil pressure value setting.

* * * * *